March 30, 1948. C. FARROW 2,438,634
REMOTE CONTROL GENERATOR CIRCUIT
Filed Dec. 8, 1943
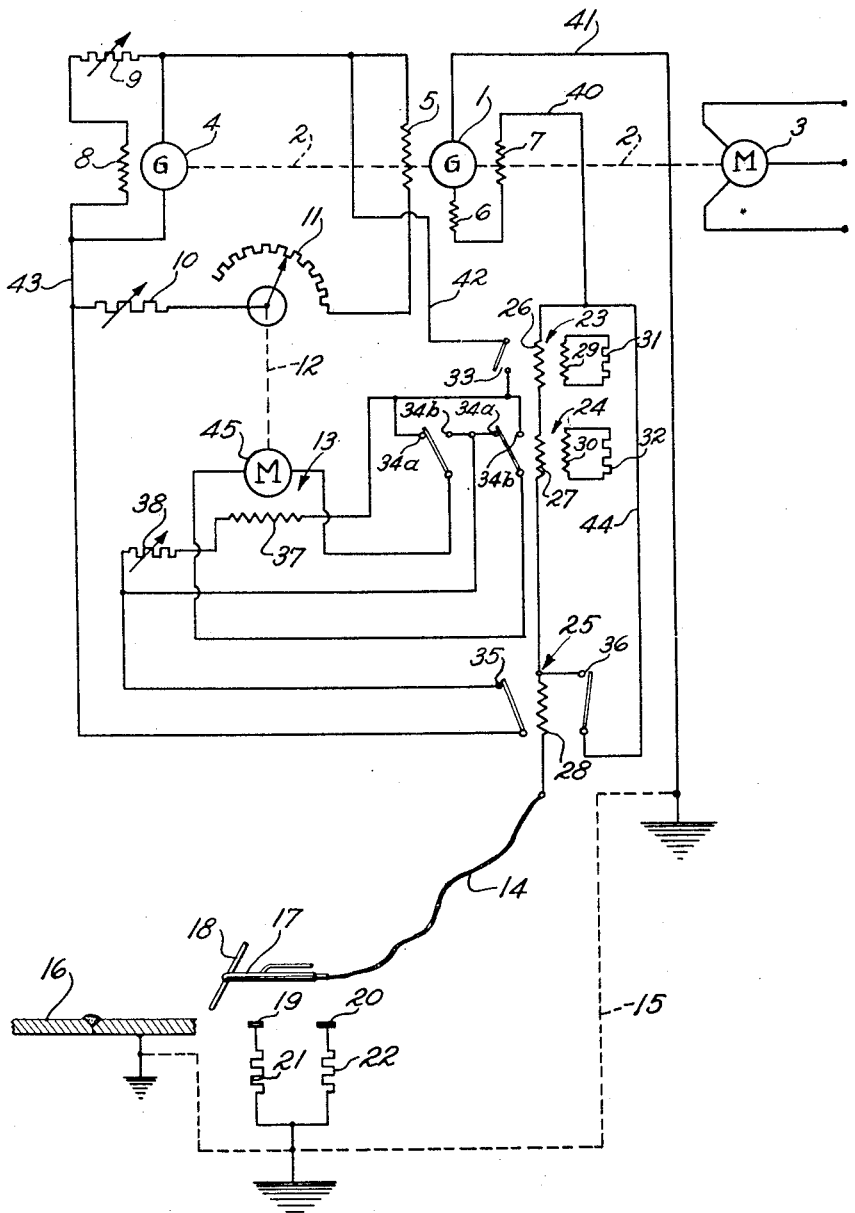
INVENTOR.
CECIL FARROW
BY
Richey & Watts
ATTORNEYS

UNITED STATES PATENT OFFICE 2,438,634

REMOTE-CONTROL GENERATOR CIRCUIT

Cecil Farrow, Bainbridge Township,
Geauga County, Ohio

Application December 8, 1943, Serial No. 513,383

7 Claims. (Cl. 322—80)

This invention relates to control circuits and more particularly to a remote control circuit. It has particular application to such circuits as may be used for controlling the voltage of arc welding generators at a point remote from the generator.

As is well known to those versed in the art, it is desirable, and in many instances necessary, to control the voltage of the welding current used in arc welding. That is, some work, such as light work, for best welding requires less voltage than heavier work.

Heretofore, there has been provided means for controlling the voltage output of the welding generator. This has usually comprised mainly a manual adjustment, usually effected by adjusting a rheostat disposed on the control panel for the generator. When the welder desired to change the voltage he went over to the machine and adjusted the resistance manually to provide the desired output. This had a disadvantage that he had to leave his work and go over to the generator to make the adjustment. This becomes quite undesirable when the welder is working a point remote from the machine as in the case of shipbuilding. In this case the generator is usually at a different level than that where the welding is being done and the control cables from the generator may be carried up to scaffolds at considerable height. This is also true in the welding of steel superstructures in tall buildings. In many cases the type of material varies from heavy to light and often requires considerable change in generator output as the welding progresses. It can therefore be seen that when frequent changes are necessary that the time and energy used to effect these changes represents a considerable item.

By the present invention I have provided a system of control for controlling the voltage output of the generator at the point remote from the generator and where the welding is being effected. Furthermore, I am able to effect this control through the medium of my improved circuit without providing any additional feed cables since the control is effected through the same cables carrying the welding current.

Although the invention about to be described is described as used in connection with an arc welding generator and an arc welding circuit is particularly described, it will be seen that it is also applicable to other uses than arc welding.

It is therefore an object of my invention to provide an improved control circuit.

Another object of my invention is to provide an improved remote control circuit.

Another object of my invention is to provide an improved remote control arc welding circuit.

Another object of my invention is to provide a means for improving the quality of welding by making it easy for an arc welding operator to adjust the voltage or current in his arc.

Another object of my invention is to improve the efficiency in arc welding by enabling an arc welding operator to quickly make adjustments without having to leave his job and go to the welding generator.

Another object of my invention is to provide a remote control for an arc welding generator where no additional cables or wires from the generator to the point of use are necessary.

Still other objects of the invention and the invention itself will become more apparent from the following description of an embodiment thereof which description is illustrated by the accompanying diagram and forms a part of this application.

In the drawing, the sole figure is a schematic diagram of an arc welding generator circuit incorporating therein the circuit of my invention.

Referring to the drawing, briefly the invention contemplates a main welding current generator having a shunt field winding which is excited by a separate exciting generator. The output from the main generator is determined by the current through the shunt field, and the current through the shunt field may be regulated by a suitable series resistance. The resistance in turn is varied by a reversible motor and the motor controlled remotely by the welding operator.

More specifically a main generator 1 is provided being driven through a shaft indicated diagrammatically at 2 by a driving motor 3. The shaft 2 also connects the exciter-generator 4 to the motor. The drive motor 3 is indicated as a three-phase motor, it can, however, be any kind of a motor or some other motive power such as an engine may be substituted.

The main generator 1 is illustrated as having a shunt field winding 5, an interpole field winding 6, and a series field winding 7. As will hereinafter more clearly appear the windings 6 and 7 are not essential to the invention as shown but are illustrative of a type of generator where one or the other or both would normally be built into an arc welding generator of the type indicated.

The output connections from the main generator are indicated by the lines 40 and 41 and the voltage in the output is determined by the amount of excitation in the winding 5. The open circuit voltage from such a generator may be varied between 50 and 150 volts. The winding 5 is excited by the generator 4 through a manually adjustable rheostat 10 and the motor driven rheostat 11. The exciter generator is self-excited through the manually adjustable rheostat 9 and field winding 8.

The rheostat 11 is mechanically coupled by a shaft 12 to a reversible motor 13, which may be of the gear reduction type, to drive the shaft 12 at a speed to permit accurate control and prevent damage to the rheostat and too sudden changes in the amount of resistance added or taken out of the field circuit. Operation of the rheostat 11 increases or decreases the current in the field winding 5 and thus increases or decreases the voltage output from the main generator 1.

The motor 13 is energized from the lines 42—43 from the exciter-generator and is controlled by a pair of relays which operate contacts causing it to rotate in one direction or the other. The relays in turn are caused to operate by the current flow in the welding feed line; a third relay operates to prevent operation of either of the other relays for the motor during welding.

The control relays 23, 24 and 25 have their operating windings 26, 27 and 28 serially connected with each other and in the main welding line 40 which supplies current to the line 14 and to the welding electrode 18 which is carried by a holder 17.

The relay 23 is designed to operate when a current of 1 ampere flows through the coil 26. Relay 24 is designed to operate when 6 amperes of current flow and relay 25 when 30 amperes of current flow.

The work 16 is connected to ground or preferably through the ground cable 15 to the grounded line 41 in the main generator output. Also connected to the ground 15 are resistances 21 and 22 each having electrode contacts 19 and 20, respectively. In one case the resistance 21 could be about 40 ohms and the resistance 22 about 8 ohms. Current may flow in the output when an arc is drawn from the work 16 or when the electrode is touched to either contact 19 or 20. It will therefore be observed that the current flow through the line 40—14 will be greatest when the arc is drawn from the work 16, considerably less when connected to contact 20 and least when contacted with 19. The relays then are operable so that 23 operates when the least current (electrode 18 touching contact 19) flows through 40—14; 24 operates when 18 is touched to 20 giving medium current and 25 operates when the greatest current is drawn by actual welding.

If the operator desires to increase the output from the generator he touches the electrode 18 to the contact 19; current then flows through the line 40, the series relay windings, line 14, electrode 18, contact 19, resistance 21 (40 ohms) by the ground 15 back to generator output 41. Assuming the operating voltage to be between 50 and 150 volts this will provide a current flow in the output circuit of the generator 1 of between 1.25 and 3.75 amperes. This causes the relay 23 to operate but is insufficient current for relays 24 and 25 to operate. The winding 26 causes the normally open contacts 33 to be closed causing current to be supplied to the field winding 37 and the armature 45 of the motor 13 through the normally closed contacts of the relay 25. The current in armature 45 also flows through the normally closed contacts 34a of the relay 24. This energizes the motor 13 which moves the rheostat arm clockwise reducing the resistance and hence increasing the current in the field winding 5 of the generator 1, and increasing the output of the generator. When the electrode 18 is removed from the contact 19, the circuit is broken, relay 23 then becomes de-energized, the contacts 33 open and the control motor 13 stops.

If it should be desired to decrease the output from the generator 1 the operator touches the electrode to the contact 20 and since the resistance 22 is only about 8 ohms the current then flowing through the line 40—14 will be between 6.25 and 18.75 amperes. This causes relay 24, which operates on 6 amperes, to open contacts 34a and close the contacts 34b.

At this point it will be noted that it is desirable to have relay 24 operate prior to the operation of relay 23, in order to prevent the motor 13 from starting first in one direction then immediately being reversed to go in the other direction. In effecting this the relay 23 is provided with a suitable time delay which causes it to operate subsequent to relay 24. This may be provided by the secondary winding 29 and the series resistor 31. Resistor 31 may conveniently be the internal resistance of the winding 29 in which case the winding 29 would simply be short circuited. Other means of providing this delayed action in the relay such as a weighted armature or a dashpot mechanism as well as other means well known to those versed in the art and it is not my intention that the invention be limited to a particular form of time delay in the relays.

When the relay 24 operates, the contacts are first reversed from 34a to 34b, the relay 23 then closes and the circuit to the motor 13 is reversed causing the motor 13 to operate in the reverse direction and moving the arm of the rheostat in the reverse direction (counterclockwise), increasing the resistance in the circuit with the field winding 5 hence reducing the current in that winding and reducing the output from the generator 1. Thus the voltage may be reduced within the limits permitted by the rheostat 11, as much as desired so long as the electrode 18 is held on the contact 20. When the circuit is broken, both relays 23 and 24 open and the motor 13 is de-energized leaving the desired amount of resistance in the field of the generator 1.

When an arc is struck by engaging the electrode 18 with the work 16 the resistance then in the ground circuit is very low and the current therefor drawn will be 30 amperes or more, it being assumed that the arc welding generator will deliver over 30 amperes for normal welding operation. When this amount of current flows through the line 40—14 the relay 25, which is without time delay, will operate opening the normally closed contacts 35 and thence the circuit to the motor 13. At the same time contacts 36 will close shorting out the coils 26 and 27 of the other relays by the line 44. Relay 24 may also be provided with a time delay by the secondary winding 30 and resistance 32 but the time delay in this case should be less than in the case of the relay 23. Thus when a large current is drawn the motor 13 remains in its last operated position.

It may not be necessary to use both sets of contacts 35 and 36 since the shorting of the operating coils 26 and 27 may prevent the operation of the relays 23 and 24 and hence the motor 13. However, these operating coils (26 and 27) should be of low ohmic resistance so that enough current will pass through them to operate relay 25. Thus, if contact 36 should develop any appreciable resistance, enough current may flow through coil 26 to operate relay 23. On the other hand contacts 36 could be eliminated if the relay coils are so designed as to be able to stand full welding current continuously. In this event only contacts 35 would be necessary. Also the coils 26, 27 and 28 could be conveniently and properly designed to improve the welding characteristics by means of their inductance in a manner well known to designers of arc welding equipment.

The control resistors 21 and 22 and the contacts 19 and 20 should preferably be mounted in a small box or container to be easily portable. The contacts 19 and 20 may be of carbon or graphite or of any suitable material to resist arcing as the connection is broken. The box may be grounded in any convenient manner. If the return cable 15 is used it may be fastened to the cable, or it may be provided with clips to allow it to be fastened to some projecting part of the work. In some instances it may contain magnets to hold it in firm contact with the work or some adjacent grounded structure.

It may also be possible, instead of making contact with the electrode 18, to provide an auxiliary contact on the electrode holder 17 made of some material which would resist arcing. Such contacts could easily be made replaceable.

A meter placed between resistors 21 and 22 and ground could be provided to show the amount of current flowing and thus the generator voltage for each control contact.

The circuit as shown provides control of the current flowing in the shunt field 5 of the welding generator 1. In some cases it may be desirable to change the number of turns of series winding 7 or to change the value of a series resistor in the welding circuit. The same principle of selective relay action may be used in each of these cases. Also more control resistors may be used along with more relays to provide control of both a shunt field and a series field. Furthermore, the connections to the motor 13 may be such that the operation of relay 23 alone will decrease excitation and operation of 23 and 24 will increase excitation.

To prevent damage to motor 13 or rheostat 11 due to trying to drive rheostat 11 too far, limit switches, not shown, may be provided. Still another means would be to provide a slip clutch between the motor 13 and rheostat 11 which would slip upon the arm of the rheostat reaching the limits of its movement, or the motor 13 could be chosen to have low enough torque so that it would not damage the rheostat when stalled. In the latter case the motor could be designed to be undamaged by stalled rotor currents.

The values of currents and voltages above are merely recited as an illustrative example and could be varied within wide limits depending upon the particular application to which the device is put.

Having thus described my invention in an embodiment thereof, I am aware that numerous and extensive departures therefrom will become apparent to those versed in the art but without departing from the spirit or scope of my invention.

I claim:

1. A remote control circuit including a main feed line, a first means operative in response to current in said feed line, a second means responsive to current of a different magnitude in the feed line and a third means responsive to current of still a different magnitude in said feed line and means to vary the current through the feed line to selectively operate said current responsive means, delay means connected to said second current responsive means to cause it to operate after the third means and delay means in said first current operated means to cause it to operate last.

2. A remote control circuit including a main feed line, a first means operative in response to current in said feed line, a second means responsive to current of a different magnitude in the feed line and a third means responsive to current of still a different magnitude in said feed line and means to vary the current through the feed line to selectively operate said current responsive means, and delay means in said first current operated means to cause it to operate last, said third means connected to render said first and second means inoperative upon operation of the third means.

3. A remote control circuit including a main feed line, a first means operative in response to current in said feed line, a second means responsive to current of a different magnitude in the feed line and a third means responsive to current of still a different magnitude in said feed line and means to vary the current through the feed line to selectively operate said current responsive means, delay means connected to said second current responsive means to cause it to operate after the third means and delay means in said first current operated means to cause it to operate last, said third means connected to render said first and second means inoperative upon operation of the third means.

4. A remote control for an arc welding generator system having a main generator for generating high currents and a welding circuit connected thereto, an exciting generator for exciting the field of the main generator, means connected in the exciter-generator output to allow the output of the exciter to be controlled and hence the output of the main generator comprising a variable current controlling means, drive means for driving said control means in either direction and a control circuit therefor and means to control said drive means comprising a first relay sensitive to small current flows in the welding circuit connected in the drive means circuit to cause said drive means to operate in one direction in response to such small current flow, a second relay sensitive to medium currents in the welding circuit connected in the drive means circuit to cause said drive means to operate in the other direction in response to such medium current flow, and a third relay sensitive to currents of greater magnitude than either the first or second relay to hold inoperative said first and second relays during flow of welding current.

5. A remote control for an arc welding generator system having a main generator for generating high currents for welding and an exciting generator for exciting the field of the main generator, a feed line for conducting current from the main generator to the point of work, means connected in the exciter-generator output to allow the output of the exciter to be controlled and hence the output of the main generator comprising a variable current controlling means, electrical polarity responsive drive means for driving said control means in either direction and a control circuit therefor and means to control said drive means from the welding station comprising a first relay sensitive to small current flows in said feed line connected in the drive means circuit to cause said drive means to operate in one direction, a second relay sensitive to medium currents in said feed line connected in the drive means circuit for reversing polarity of said control circuit to cause said drive means to operate in the other direction, and a third relay sensitive to welding currents to hold inoperative said first and second relays, and means for contact with the welding electrode to provide controlling currents, said relays being disposed serially in said feed line.

6. A remote control for an arc welding generator system having a main generator for generating high currents and a welding circuit connected thereto, an exciting generator for exciting the field of the main generator, means connected in the exciter-generator output to allow the output of the exciter to be controlled and hence the output of the main generator comprising a variable current controlling means, drive means for driving said control means in either direction and a control circuit therefor and means to control said drive means from the welding station comprising a first relay sensitive to small current flows serially connected in said welding circuit and connected in the drive means circuit to cause said drive means to operate in one direction, a second relay sensitive to medium currents serially connected in said welding circuit and connected in the drive means circuit to cause said drive means to operate in the other direction, and a third relay serially connected in said welding circuit and sensitive to welding currents to hold inoperative said first and second relays, means for contact with the welding electrode to provide controlling currents, and time delay means to cause the first relay to act last.

7. A remote control for an arc welding generator system having a main generator for generating high currents and a welding circuit connected thereto, an exciting generator for exciting the field of the main generator, means connected in the exciter-generator output to allow the output of the exciter to be controlled and hence the output of the main generator comprising a variable current controlling means, drive means for driving said control means in either direction and a control circuit therefor and means to control said drive means from the welding station comprising a first relay sensitive to small current flows serially connected in the welding circuit and connected in the drive means circuit to cause said drive means to operate in one direction, a second relay sensitive to medium currents serially connected in said welding circuit and connected in the drive means circuit to cause said drive means to operate in the other direction, and a third relay sensitive to welding currents, serially connected in said welding circuit to hold inoperative said first and second relays, and means for contact with the welding electrode to provide controlling currents, and time delay means in said first and second relay circuits to cause the third relay to operate first, said second relay second and the first relay to act last.

CECIL FARROW.

REFERENCES CITED

The following references are of record in the file of this patent:

UNITED STATES PATENTS

| Number | Name | Date |
|---|---|---|
| 2,060,772 | Moffett | Nov. 10, 1936 |
| 2,068,551 | Landis | Jan. 19, 1937 |
| 2,189,603 | Graham | Feb. 6, 1940 |